(12) United States Patent
Douglas et al.

(10) Patent No.: US 11,670,252 B2
(45) Date of Patent: Jun. 6, 2023

(54) POWER MANAGEMENT FOR IMAGE DISPLAY

(71) Applicant: Apple Inc., Cupertino, CA (US)

(72) Inventors: Simon M. Douglas, Cupertino, CA (US); Ross Thompson, Los Gatos, CA (US); Russell A. Blaine, San Carlos, CA (US); Arthur L. Spence, San Jose, CA (US); Brad W. Simeral, San Francisco, CA (US); Giovanni M. Agnoli, San Mateo, CA (US); Chendi Zhang, Mountain View, CA (US); Jacob Z. Weiss, Sunnyvale, CA (US); Yiqiang Nie, San Francisco, CA (US); Brent W. Schorsch, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/888,606

(22) Filed: May 29, 2020

(65) Prior Publication Data

US 2020/0380926 A1    Dec. 3, 2020

Related U.S. Application Data

(60) Provisional application No. 62/855,811, filed on May 31, 2019.

(51) Int. Cl.
*G06F 1/3218* (2019.01)
*G09G 3/36* (2006.01)

(52) U.S. Cl.
CPC ......... *G09G 3/3611* (2013.01); *G06F 1/3218* (2013.01); *G09G 2330/021* (2013.01); *G09G 2360/18* (2013.01)

(58) Field of Classification Search
CPC .......... G09G 3/3611; G09G 2330/021; G09G 2360/18; G09G 3/20; Y02D 10/00; G06F 1/3218; G06F 1/3287; G06F 1/3293; G06F 3/017; G06F 3/0482
See application file for complete search history.

(56) References Cited

U.S. PATENT DOCUMENTS

| | | | | |
|---|---|---|---|---|
| 2014/0002739 A1* | 1/2014 | Kwa | .......................... | G06F 3/14 |
| | | | | 348/536 |
| 2014/0051478 A1* | 2/2014 | Gu | ......................... | H04M 1/725 |
| | | | | 455/556.1 |
| 2014/0281607 A1* | 9/2014 | Tse | ......................... | G06F 1/3287 |
| | | | | 713/320 |
| 2015/0154732 A1* | 6/2015 | Artamonov | ............... | G06T 1/60 |
| | | | | 345/545 |
| 2015/0277540 A1* | 10/2015 | Jackson | .............. | G06F 3/03547 |
| | | | | 345/169 |
| 2016/0063664 A1* | 3/2016 | Mizuno | ..................... | G06T 1/20 |
| | | | | 345/502 |

(Continued)

*Primary Examiner* — Md Saiful A Siddiqui
(74) *Attorney, Agent, or Firm* — BakerHostetler

(57) ABSTRACT

A device implementing a system for displaying an image includes a processor configured to, generate, during a first power state of a device, a data structure specifying image frames and a respective display time for each of the image frames, and retrieve, during a second power state of the device and from the data structure, an image frame based on the respective display time for the image frame. The at least one processor is further configured to display, during a third power state of the device, the retrieved image frame on a display of the device.

22 Claims, 9 Drawing Sheets

(56) References Cited

U.S. PATENT DOCUMENTS

| | | | |
|---|---|---|---|
| 2016/0247306 A1* | 8/2016 | Jang | G09G 3/3406 |
| 2016/0267883 A1* | 9/2016 | Bibikar | G06F 1/3218 |
| 2017/0061934 A1* | 3/2017 | Shin | G09G 5/18 |
| 2017/0352325 A1* | 12/2017 | Spence | G06T 13/80 |
| 2018/0108111 A1* | 4/2018 | Zhu | G06F 9/44 |
| 2018/0122334 A1* | 5/2018 | Coppin | G09G 3/20 |
| 2018/0204303 A1* | 7/2018 | Bae | G09G 5/363 |
| 2018/0367840 A1* | 12/2018 | Kleinerman | H04N 21/4312 |

* cited by examiner

POWER MANAGEMENT FOR IMAGE DISPLAY

CROSS REFERENCE TO RELATED APPLICATIONS

This application claims the benefit of priority to U.S. Provisional Patent Application No. 62/855,811, entitled "Power Management for Image Display," filed on May 31, 2019, the disclosure of which is hereby incorporated herein in its entirety.

TECHNICAL FIELD

The present description relates generally to displaying images on a device, including managing power consumption while displaying a sequence of images on a device.

BACKGROUND

A device such as a smartwatch, a smartphone, a laptop or a wearable device may display a sequence of images. For example, a clock application running on a smartwatch may display a sequence of images to reflect the movement of clock hands.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

Figure 1:
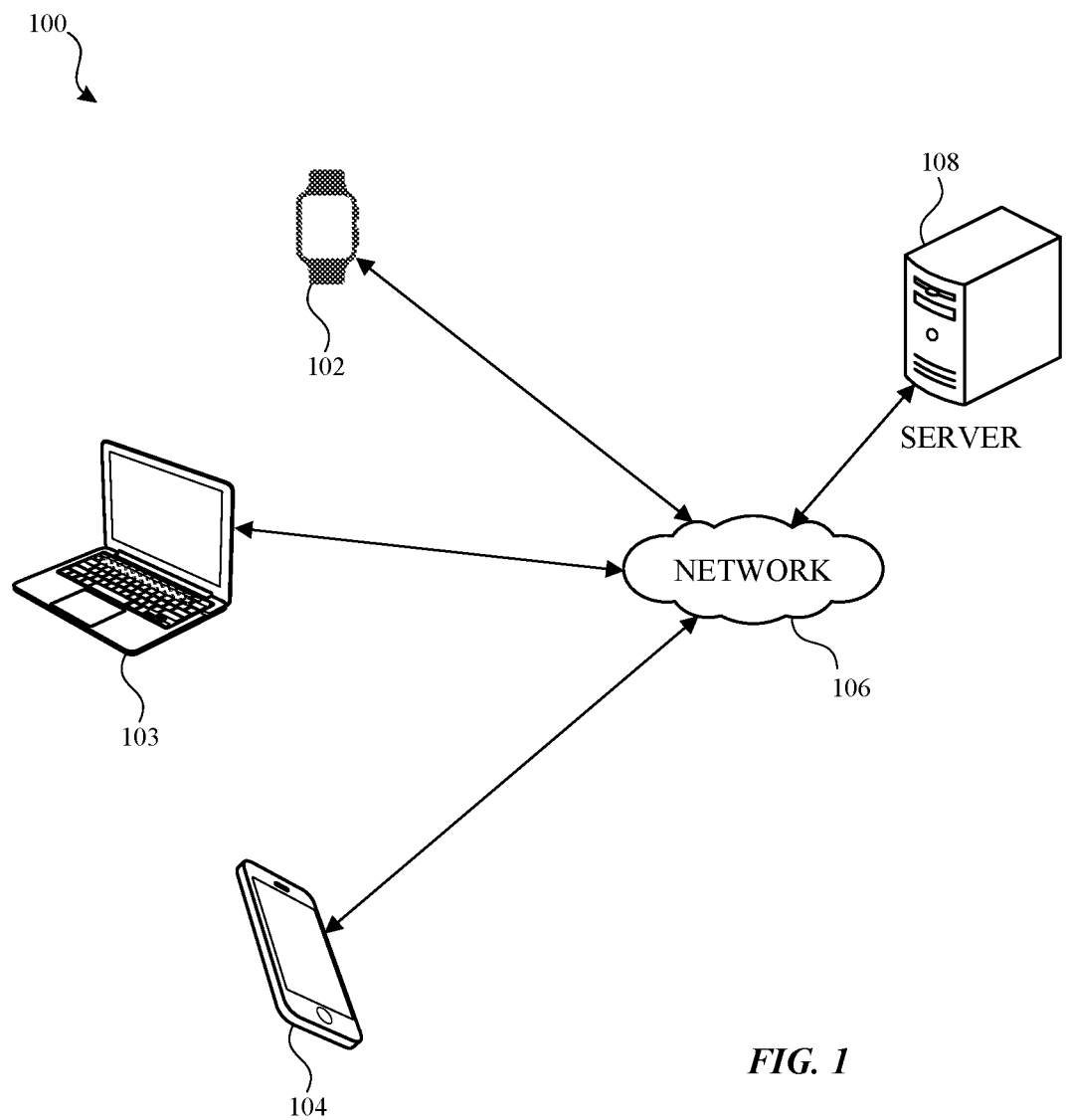
FIG. 1 illustrates an example network environment for managing power consumption while displaying images in accordance with one or more implementations.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

A device such as a smartwatch, a smartphone, a laptop or a wearable device may display images, such as a sequence of images or a series of images. For example, a clock application running on a smartwatch may display a sequence of images to reflect the movement of clock hands to show time. The clock application may further be configured to display one or more watch complications, such as a weather complication (e.g., temperature), a date complication (e.g., a day of the week and/or a day of the month) and/or third party data complication (e.g., notifications).

For example, the device may display the clock hands and/or watch complications in association with a wrist-raise gesture (e.g., indicating user intent to view content on the screen of the device). With respect to a wrist-down gesture (e.g., indicating user intent not to view content), some systems may simply disable the display of the smartwatch. However, in some cases, it may be desirable to display information (e.g., clock hands and/or watch complications) after a wrist-down gesture, for example, so the user can still see the time without necessarily having to rotate the device to re-activate the display. However, providing for continuous display of the information (and the corresponding images) may require that the user space of the device (e.g., memory and/or resources allocated to running applications) be active to provide the updated images, which results in increased power consumption (e.g., and decreased battery life).

In one or more implementations, the subject system provides for continuous (or prolonged) display of information while reducing power consumption by providing three separate and independent power states to support the continuous display. In a first power state, a device may generate a data structure including image frames and associated scheduled (e.g., future) display times for displaying the image frames. The first power state may correspond to activating the user space of the device (e.g., without activating all or part of the kernel space and/or without refreshing the display of the device). During a second power state, the device retrieves the image frames from the data structure based on the scheduled display times. The second power state may correspond with activating a display driver (e.g., in the kernel space), configured to send the retrieved image frames to the device display (e.g., without refreshing the display). The device displays, during a third power state of the device, the retrieved image data on the device display. The third power state may correspond to refreshing the display (e.g., retrieving an updated image from the framebuffer for the display), with the user space and/or the kernel space not being active. Segmenting these operations into different power states may reduce the power consumption associated with the continuous display of information, such as by reducing the amount of time that the user space and/or the kernel space need to be active to support the continuous display.

In one or more implementations, the subject system further provides for refreshing displayed image data based on detecting a first gesture state and a second gesture state (e.g., corresponding to a wrist-raise gesture). For example, the first gesture state may correspond to an initial amount of motion (e.g., device motion suggesting wrist raising, rotating and/or flicking, where flicking may be a quick short movement of the hand/wrist) within a timeframe, where the initial amount of motion indicates that the wrist-raise gesture may occur. The second gesture state may correspond to a continued amount of motion (e.g., wrist raising, rotating and/or flicking) within a subsequent timeframe, where the continued amount of motion suggests a completion/confirmation of the wrist-raise gesture. In some instances, device motion may indicate the first gesture state but not the second gesture state, corresponding to a cancel operation (e.g., where initial device motion suggested a wrist-raise gesture, but subsequent motion indicated that the wrist-raise gesture did not complete).

The device may detect the first gesture state associated with motion of the device and in response, set the device to a first power state (e.g., waking up an application processor of the device). The device may detect, subsequent to detecting the first gesture state, a second gesture state corresponding to motion associated with viewing the device display. In response, the device may set the device to a second power state (e.g., waking up the user space), and may refresh the image data displayed on the device display. By waiting for the second gesture state to activate the user space, it may be possible to avoid unnecessary power consumption when a cancel operation is detected subsequent to the first gesture state (e.g., instead of detecting the second gesture state), since the user space does not need to be activated for a cancel operation.

FIG. 1 illustrates an example network environment 100 for managing power consumption while displaying images in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The network environment 100 includes electronic devices 102, 103 and 104 (hereinafter 102-104), a network 106 and a server 108. The network 106 may communicatively (directly or indirectly) couple, for example, any two or more of the electronic devices 102-104 and the server 108. In one or more implementations, the network 106 may be an interconnected network of devices that may include, and/or may be communicatively coupled to, the Internet. For explanatory purposes, the network environment 100 is illustrated in FIG. 1 as including electronic devices 102-104 and a single server 108; however, the network environment 100 may include any number of electronic devices and any number of servers.

One or more of the electronic devices 102-104 may be, for example, a portable computing device such as a laptop computer, a smartphone, a smart speaker, a peripheral device (e.g., a digital camera, headphones), a tablet device, a wearable device such as a smartwatch, a band, and the like, or any other appropriate device that includes, for example, one or more wireless interfaces, such as WLAN radios, cellular radios, Bluetooth radios, Zigbee radios, near field communication (NFC) radios, and/or other wireless radios. In FIG. 1, by way of example, the electronic device 102 is depicted as a smartwatch, the electronic device 103 is depicted as a laptop computer, and the electronic device 104 is depicted as a smartphone.

Each of the electronic devices 102-104 may be configured to activate different power states, with each power state being associated with a respective level of power consumption. In addition, an application (e.g., a clock application) may be running on the electronic devices 102-104. Moreover, each of the electronic devices 102-104 may be configured to switch between power states in conjunction with updating/refreshing displayed information provided by the application (e.g., the clock application). In one or more implementations, the switching between power states may provide for an image to be displayed continuously (e.g., continuous display of time and/or watch complications), with reduced power consumption (e.g., relative to continuously running in a high power state in which the user space is active for prolonged periods of time). Each of the electronic devices 102-104 may be, and/or may include all or part of, the device discussed below with respect to FIG. 2, and/or the electronic system discussed below with respect to FIG. 9.

The server 108 may be, and/or may include all or part of the electronic system discussed below with respect to FIG. 9. The server 108 may include one or more servers, such as a cloud of servers. For explanatory purposes, a single server 108 is shown and discussed with respect to various operations. However, these and other operations discussed herein may be performed by one or more servers, and each different operation may be performed by the same or different servers. In one or more implementations, one or more of the electronic devices 102-104 may implement the subject system independent of the network 106 and/or independent of the server 108.

Figure 2:
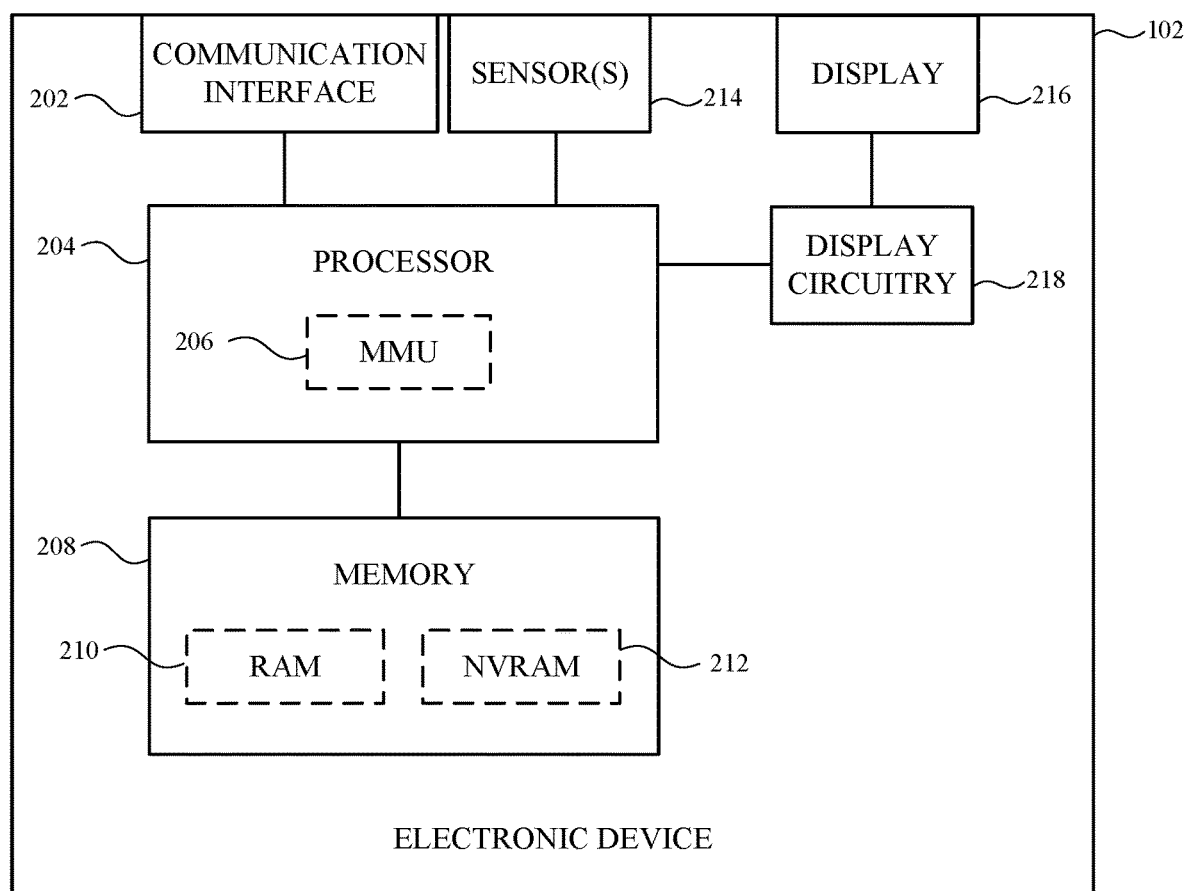
FIG. 2 illustrates an example device that may implement a system for managing power consumption while displaying images in accordance with one or more implementations.

FIG. 2 illustrates an example device that may implement a system for managing power consumption while displaying images in accordance with one or more implementations. For explanatory purposes, FIG. 2 is primarily described herein with reference to the electronic device 102. However, FIG. 2 may correspond to any of the electronic devices 102-104 of FIG. 1. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The electronic device 102 may include a communication interface 202, a processor 204 (with an optional a memory management unit (MMU) 206, depicted with dashed lines), a memory 208 (with an optional random access memory (RAM) 210 and/or an optional non-volatile random-access memory (NVRAM) 212, depicted in dashed lines), sensor(s) 214, display circuitry 218 and/or a display 216. The processor 204 may include suitable logic, circuitry, and/or code that enable processing data and/or controlling operations of the electronic device 102. In this regard, the processor 204 may be enabled to provide control signals to various other components of the electronic device 102. The processor 204 may also control transfers of data between various portions of the electronic device 102. Additionally, the processor 204 may enable implementation of an operating system or otherwise execute code to manage operations of the electronic device 102.

The memory 208 may include suitable logic, circuitry, and/or code that enable storage of various types of information such as received data, generated data, code, and/or configuration information. The memory 208 may include, for example, the RAM 210, the NVRAM 212, read-only memory (ROM), flash and/or magnetic storage.

In one or more implementations, the memory 208 may store code corresponding to one or more applications (e.g., a clock application). For example, the one or more applications may be implemented as part of an operating system of the electronic device 102. In addition, the one or more applications may store content (e.g., image data) in the memory 208 (e.g., within a data structure such as a queue), and this content may be accessed and displayed on a display of the electronic device 102.

As noted above, one or more of the MMU 206, the RAM 210 and/or the NVRAM 212 may be optional components. For example, the processor 204 may provide for the mapping of content (e.g., image data) between virtual memory and physical memory (e.g., the RAM 210 and/or the NVRAM 212). Thus, the MMU 206 of the processor 204 may include suitable logic, circuitry, and/or code that enables the mapping of logical addresses (e.g., in virtual memory) to physical addresses (e.g., in the RAM 210 and/or the NVRAM 212).

The RAM 210 may correspond to volatile memory, for example, memory that loses its information when power for the electronic device 102 is turned off. While FIG. 2 illustrates the use of RAM as volatile memory, it is possible for the electronic device 102 to use other types of volatile memory instead of or as a supplement to the RAM 210, including but not limited to DRAM, SRAM, T-RAM, Z-RAM, and TTRAM.

Moreover, the NVRAM 212 may correspond to nonvolatile memory, for example, memory configured to retain its information when power for the electronic device 102 is turned off. While FIG. 1 illustrates the use of NVRAM as nonvolatile memory, it is possible for the electronic device 102 to use other types of nonvolatile memory instead of or as a supplement to the NVRAM 212, including but not limited to flash, nvSRAM, FeRAM, FeTRAM, MRAM, PRAM, CBRAM, SONOS, RRAM, NRAM, racetrack memory, FJG, and Millipede memory.

The sensor(s) 214 may include one or more motion sensor(s), such as an accelerometer, a gyroscope, an optical sensor, and the like. The sensor(s) 214 may be used to facilitate movement and orientation related functions of the electronic device 102, for example, to detect movement, direction, and orientation of the electronic device 102. In one or more implementations, output from the motion sensor(s) may be used to determine different gesture states associated with a motion-based gesture (e.g., a wrist-raise gesture and/or a wrist-down gesture) of the electronic device 102.

In one or more implementations, the sensor(s) 214 may include an ambient light sensor. For example, the ambient light sensor may include a photodetector configured to detect the amount of ambient light, and to adjust display brightness based on the detected amount of ambient light. In one or more implementations, it is possible that screen pixel(s) may be positioned on top of the ambient light sensor. These pixels may produce light which may potentially interfere with the ambient light sensor's ability to detect ambient light. Thus, the processor 204 may be configured to determine which pixels are in a position to potentially interfere with the ambient light sensor and/or to adjust output of the ambient light sensor accordingly. For example, the adjustment of ambient light sensor output may be based on weighted values assigned to the pixel(s) based on their respective position and/or light characteristics (e.g., brightness, color and the like).

The communication interface 202 may include suitable logic, circuitry, and/or code that enables wired or wireless communication, such as between any of the electronic devices 102-104 and the server 108 over the network 106. The communication interface 202 may include, for example, one or more of a Bluetooth communication interface, a cellular interface, an NFC interface, a Zigbee communication interface, a WLAN communication interface, a USB communication interface, or generally any communication interface.

In one or more implementations, the processor 204 may generate or receive data that is to be displayed on the display 216. This display data may be processed, scaled, modified, and/or provided to the display circuitry 218 (e.g., such as a graphics processing unit (GPU)). For example, image frames (e.g., including display pixel values for display using pixels) may be provided by the processor 204 to the display circuitry 218. The display circuitry 218 may process the image frames and provide processed images for displaying on the display 216.

In one or more implementations, one or more of the communication interface 202, the processor 204, the MMU 206, the memory 208, the RAM 210, the NVRAM 212, the sensor(s) 214, the display 216, the display circuitry 218 and/or one or more portions thereof, may be implemented in software (e.g., subroutines and code), may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both.

Figure 3:
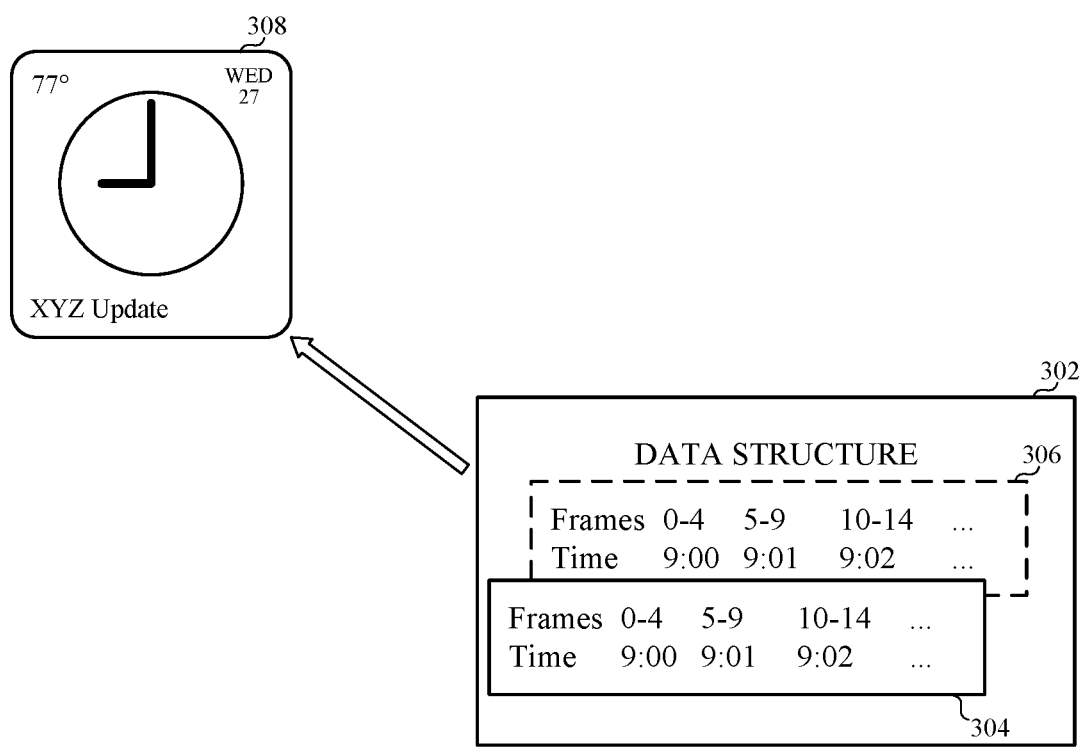
FIG. 3 illustrates an example of a data structure for displaying an image in accordance with one or more implementations.

FIG. 3 illustrates an example of a data structure 302 for displaying an image in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

In one or more implementations, the data structure 302 may store pairs of image frame(s) with scheduled display times. The electronic device 102 may be configured to access the data structure 302 in order to display the image frame(s) at their respective scheduled display times. In one or more implementations, the data structure 302 is implemented as a queue.

In one or more implementations, the data structure 302 may be generated during a first power state corresponding to activation of a user space of the electronic device 102 (e.g., without activating all or part of the kernel space and/or without refreshing the display 216 of the electronic device 102). During a second power state corresponding to activating a display driver (e.g., and powering down the user space), the electronic device 102 may retrieve the image frames from the data structure 302 based on the scheduled display times. During a third power state corresponding to refreshing the display 216 (e.g., retrieving an updated image from the framebuffer for the display), the electronic device 102 may display the retrieved image data on the display 216.

In the example of FIG. 3, the data structure 302 includes a first queue 304 and a second queue 306. The second queue 306 may be an optional queue, as illustrated by dashed lines. The first queue 304 includes image frames (e.g., identified as 0-4, 5-9, 10-14) and scheduled display times (e.g., 9:00, 9:01, 9:02). In one or more implementations, the first queue 304 (e.g., and/or the second queue 306) stores identifiers (e.g., memory addresses) corresponding to the image frames. In the example of FIG. 3, the image frames include first image frames 0-4 scheduled for display at a time 9:00, second image frames 5-9 scheduled for display at a time 9:01, third image frames 10-14 scheduled for display at a time 9:02, and the like. The example of FIG. 3 illustrates five image frames per display time. However, the number of image frames per time period may be a value other than five (e.g., one or more image frames per display time).

In one or more implementations, each of the image frames may correspond to the one or more display field(s). For example, the user interface 308 may correspond to a smartwatch, including a graphical element to display the current time (e.g., as shown by clock hands). In addition, the user interface 308 may include one or more watch complications (e.g., functions other than the display of the time) including, but not limited to: weather (e.g., temperature of "77°"), date (e.g., day of week/month of "Wed 27"), third party data (e.g., "XYZ update") and the like.

In one or more implementations, the electronic device 102 may be configured to receive data for the complications corresponding to third party applications. For example, the third party applications may provide data/image frames and/or display times for populating the data structure 302. The electronic device 102 may be configured with the appropriate protocols and/or interfaces to receive such data from the corresponding third-party services (e.g., where the data is obtained locally from the memory 208 and/or remotely from the server 108), and update the data structure 302 (e.g., via the first queue 304 and/or the second queue 306) accordingly.

In one or more implementations, the scheduled display times (e.g., 9:00, 9:01, 9:02 and the like) may coincide with updates to one or more of the display field(s). For example, at time 9:01, the data structure 302 may include image frames 5-9 for updating the clock hand (e.g., the minutes hand), relative to image frames 0-4 at time 9:00. The image frames may further indicate any updates to the one or more of the complications (e.g., weather, date and/or third party data).

When transitioning from time 9:00 to 9:01, the image frames 5-9 may provide an animation effect for the updated image. For example, the image frames 5-9 may provide for a smoother perceived movement of the clock hand (e.g., the minutes hand) when transitioning from the time 9:00 to 9:01.

In one or more implementations, the electronic device 102 may implement a graphics compositing framework configured to display user interfaces (e.g., with animation). For example, the graphics compositing framework may be implemented as software instructions, stored in the memory 208, which when executed by the processor 204, cause the processor 204 to perform particular function(s). The graphics compositing framework may use scene graphs (e.g., a data structure such as a tree) in order to arrange the logical and/or spatial representation of a graphical scene. Thus, a graphical scene may be represented by a scene graph (e.g., a tree structure indicating color, position, size, and the like of elements), and changes to the graphical scene may be effected by updating the appropriate portions (e.g., layers, nodes and the like) of the tree.

In one or more implementations, each of the image frames (e.g., across 0-4, 5-9 and 10-14 and the like) may correspond to a separate scene graph (e.g., including all pixel data) for display of the display field(s). Thus, the image frames 0-4 may include five image scene graphs (e.g., with pixel data), the image frames 5-9 may include five scene graphs, and the image frames 10-14 may include five scene graphs.

In one or more implementations, the electronic device 102 may provide for reducing an amount of redundant image data stored in physical memory. For example, the data structure 302 may provide for storing differences (e.g., corresponding to updates) between image frames in physical memory, and using virtual memory to store image data that does not change between image frames.

As noted above with respect to FIG. 2, the electronic device 102 may implement virtual memory and physical memory. In one or more implementations, the virtual memory may be a logical component accessible by a kernel of an operating system running on the electronic device 102. In general, the virtual memory may simulate main memory (e.g., the RAM 210) by utilizing nonvolatile memory (e.g., the NVRAM 212) as temporary storage. The MMU 206 may provide for mapping of logical addresses (e.g., in virtual memory) to physical addresses (e.g., in the RAM 210 and/or the NVRAM 212).

In one or more implementations, the electronic device 102 (e.g., the kernel of the operating system) may provide for the virtual memory to re-map to portions of the same physical memory multiple times. For example, if part of an image frame does not change over multiple time intervals (e.g., the display times 9:00, 9:01, 9:02), those image frames may have multiple different logical addresses referring to the same portion(s) in physical memory where the part of the image frame is stored. In other words, different logical addresses may be mapped (e.g., using the MMU 206) to the same physical address for a part of an image frame that does not change. Thus, the electronic device 102 may use re-mapping with respect to virtual memory in order to reduce the amount of image data that is stored in physical memory at any given time.

Moreover, in one or more implementations, the electronic device 102 may use an image composition tool (e.g., a glyph-based tool) to reduce the amount of image data that is stored with respect to the data structure 302. The image composition tool may be configured to generate an image (e.g., a clock face, a watch complication) based on one or more parameters which describe the image. For example, with respect to the user interface 308, the parameters may indicate a time (e.g., or a position of clock hands), a temperature value, a day of the week/month value, a third-party update value, and/or other parameters for display characteristics (e.g., color, position, size and the like).

The image composition tool may use these parameters in order to generate the images for the user interface 308 at respective times (e.g., 9:00, 9:01, 9:02 and the like). The image frames (e.g., 0-4, 5-9, 10-14) in the first queue 304 may store these parameters, instead of or as a supplement to, actual image data (e.g., pixels). In one or more implementations, the kernel of the operating system and/or hardware components (e.g., the display circuitry 218) of the electronic device 102 may provide for generating the images of the user interface 308 based on the image composition tool. In one or more implementations, the display circuitry 218 may be configured to generate the images of the user interface 308 based on the image composition tool, e.g., without the processor 204 needing to be powered on and/or to be in a high power mode.

With respect to the second queue 306 (e.g., an optional queue), the electronic device 102 may be configured to compose images using more than one image layer. Each image layer may be displayed based on a respective memory buffer (e.g., with image frames and display times) for that image layer. For example, the electronic device 102 (e.g., the processor 24) may be configured to display a first image layer of image data based on a first memory buffer (e.g., the first queue 304), and to display a second image layer of image data based on a second memory buffer (e.g., the second queue 306).

In one or more implementations, the electronic device 102 (e.g., the processor 204) may be configured to merge the first and second image layers of image data into a single image for display (e.g., corresponding to the user interface 308). As such, the combined result may not be stored in the memory 208, and may simply be provided for display on the display 216.

In one or more implementations, each of the image layers may be associated with one or more adjustable settings (e.g., brightness level, transparency level, and the like). The electronic device 102 may be configured to assign a setting for each layer (e.g., based on metadata provided by the respective first or second queue), for example, so that the first layer has a different brightness and/or transparency relative to that of the second layer.

For example, the first queue 304 may include the image data for an overall appearance of the clock (e.g., with the exception of the clock hands), as well as the various complications (e.g., the weather, day of week/month, and third-party update). On the other hand, the second queue 306 may include the image data limited to the clock hands. By virtue of displaying the image data of the first queue 304 in a first layer and the image data of the second queue 306 in a second layer, it is possible to differentiate display of the clock hands (e.g., based on the metadata for brightness). For example, based on different environmental settings, the brightness of the clock hands relative to the background (e.g., where the background corresponds to the remainder of the clock and watch complications) can be changed (e.g., the clock hands are brighter in a well-lit environment, and/or the background is brighter in a low-lit environment).

In one or more implementations, one or more of components of the data structure 302, the first queue 304 and/or the second queue 306 are implemented as software instructions, stored in the memory 208, which when executed by the processor 204, cause the processor 204 to perform particular function(s).

In one or more implementations, one or more of components of the data structure 302, the first queue 304 and/or the second queue 306 may be implemented in software (e.g., subroutines and code), hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices), and/or a combination of both. In one or more implementations, some or all of the depicted components may share hardware and/or circuitry, and/or one or more of the depicted components may utilize dedicated hardware and/or circuitry. Additional features and functions of these modules according to various aspects of the subject technology are further described in the present disclosure.

Figure 4:
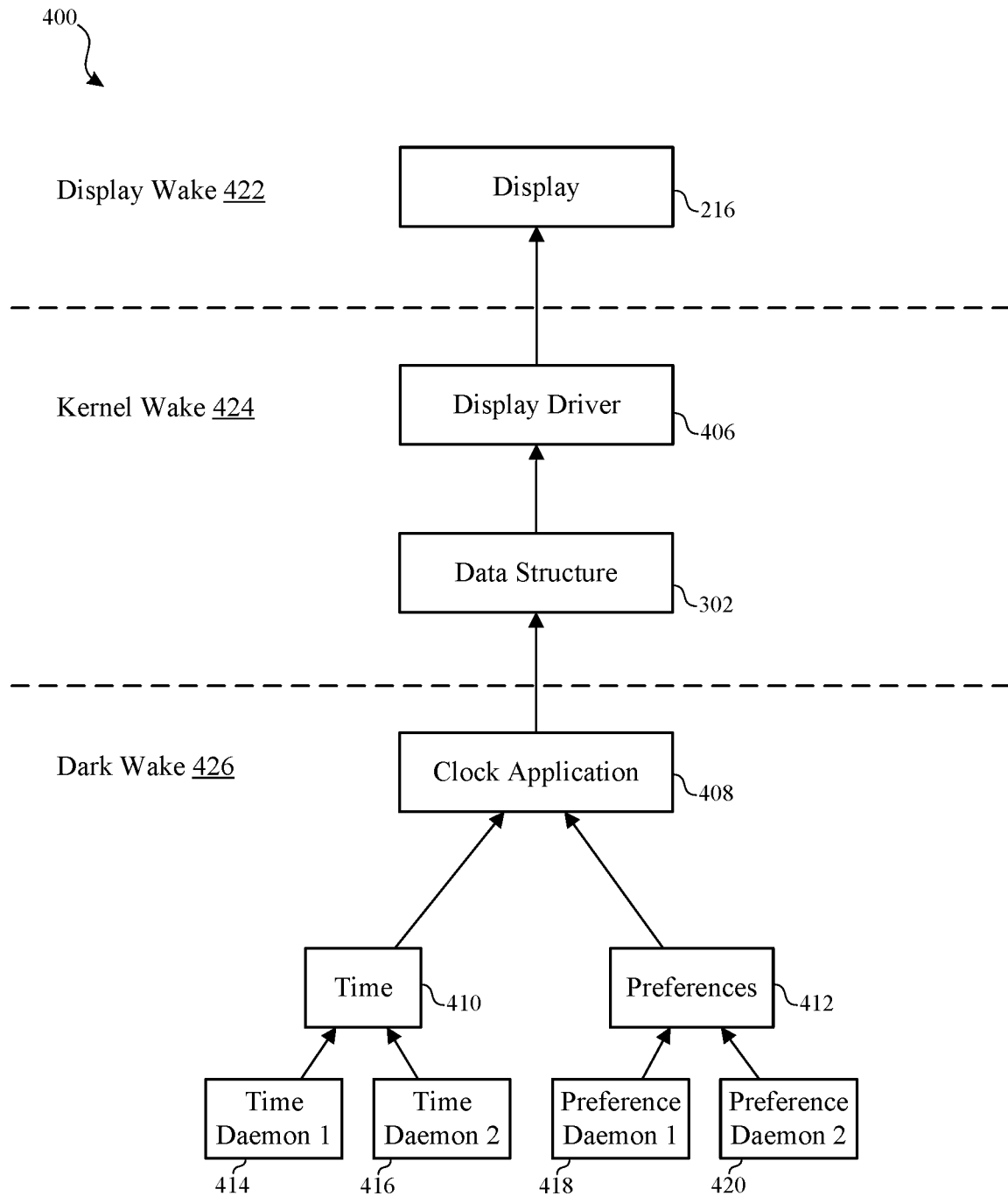
FIG. 4 illustrates an example architecture, that may be implemented by an electronic device, for using device power states in association with displaying an image in accordance with one or more implementations.

FIG. 4 illustrates an example architecture 400, that may be implemented by the electronic device 102, for using device power states in association with displaying an image in accordance with one or more implementations. For explanatory purposes, FIG. 4 is primarily described herein with reference to the electronic device 102 of FIG. 1. However, FIG. 4 is not limited to the electronic device 102 of FIG. 1, and one or more other components and/or other suitable devices (e.g., any of the electronic device 102-104) may be used instead. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

In one or more implementations, the architecture 400 may provide for reducing power consumption associated with the display of image data, for example, while maintaining continuous (e.g., or otherwise prolonged) display of a clock face and/or watch complications. During generation of the data structure 302 as described herein, the display 216 may continuously display a static image frame. In one or more implementations, the continuous display of a static image frame on the display 216 may use less power than refreshing/changing the displayed image.

The architecture may include the display 216, a display driver 406 (e.g., associated with the display circuitry 218), the data structure 302, a clock application 408, a time module 410, a preferences module 412, time daemons 414-416 and/or preference daemons 418-420. As shown in FIG. 4, use of the display 216 may be associated with a display wake state 422, use of the display driver 406 and the data structure 302 may be associated with a kernel wake state 424, and use of the clock application, the time module 410, the preferences module 412, the time daemons 414-416 and the preference daemons 418-420 may be associated with a dark wake state 426.

As noted above, the electronic device 102 (e.g., the processor 204) may be configured to generate the data structure 302, such that images may be queued for display based on respective display times. The data structure 302 may be generated during the dark wake state 426. In one or more implementations, the dark wake state 426 may correspond with activating a user space of the electronic device 102, where the user space corresponds to system memory (e.g., the memory 208) being allocated to running applications on the electronic device 102. For example, the dark wake state 426 may correspond with activating a clock application within the user space. In one or more implementations, the dark wake state 426 itself does not provide (e.g., or enable) display of image data on the display 216.

During the dark wake state 426, the clock application 408 may be configured to generate the data structure 302, in conjunction with the time module 410 and/or the preferences module 412. The time module 410 may be configured to communicate with multiple time daemons (e.g., the time daemons 414-416) for determining time and/or for synchronizing time (e.g., across different processes). The time daemons 414-416 may correspond to processes which synchronize time and/or indicate time, for providing to the time module 410 (e.g., and in turn, to the clock application 408). The clock application 408 may be configured to specify graphical content (e.g., positioning of clock hands, temperature, day of week/month, third-party update) at respective display times.

In addition, the preferences module 412 may be configured to communicate with multiple daemons (e.g., the preference daemons 418-420) for determining images to be displayed with respect to preferences (e.g., system and/or user preferences). For example, the preference daemons 418-420 may correspond to processes which specify graphical properties (e.g., color, shape, size, position and the like) for interface elements (e.g., for the clock and/or the watch complications).

In one or more implementations, the clock application 408 generates the data structure 302, where the data structure 302 specifies multiple images to be displayed at respective display times. By virtue of creating the data structure 302 in which multiple images are determined (in advance) along with their respective times for display, it is possible to display images on a scheduled basis without continually employing the user space. For example, without pre-determining the images and display times (e.g., as stored in the data structure 302), the clock application 408 would be required to generate each individual image for a given time (e.g., as provided by the time module 410) before display. This would require the user space to remain active continuously and/or for a longer amount of time (e.g., relative to pre-determining the images and display times and storing them for future use).

The kernel wake state 424 may correspond with activating a display driver 406 of the electronic device 102. The display driver 406 may provide an interface between the processor 204 and the display 216 (e.g., the screen or panel) of the electronic device 102. For the kernel wake state 424, the display driver 406 may be activated (e.g., by the kernel) at a particular time (e.g., 9:00, 9:01 or 9:02). It will be appreciated that the user space that is powered on in the dark wake state 426 does not need to be powered on during the kernel wake state 424.

The display driver 406 may retrieve the corresponding image frames (e.g., the image frames 0-4, 5-9 or 10-14) for a given time, and provide the retrieved image frames to the display 216. Since the data structure 302 assigns image frames with respective display times, the display driver 406 may be activated/awakened when needed to update an image (e.g., to display movement of a clock hand and/or an updated watch complication).

The display wake state 422 may correspond with refreshing image data on the display 216. During the display wake state 422, the display 216 provides for display of the most recent image data provided to the display 216. As noted above, the display driver 406 is configured to update the image data based on the schedule defined by the data structure 302. Thus, the display wake state 422 may provide for displaying the multiple image frames (e.g., 0-4, 5-9, 10-14 for the first queue 304 and/or the second queue 306) at respective display times (e.g., 9:00, 9:01, 9:02 for the first queue 304 and/or the second queue 306). As noted above, display of the multiple image frames may include animated transitions (e.g., as the clock hand moves from one minute to the next minute).

In one or more implementations, the electronic device 102 may be configured to detect a wrist-raise gesture and/or a wrist-down gesture. As noted above, the sensor(s) 214 (e.g., motion sensor(s)) of the electronic device 102 may be configured to detect movement, direction and/or orientation of the electronic device 102. The wrist-raise gesture may be determined when device motion suggests that the user (e.g., who is wearing the electronic device 102 on their wrist), raises, rotates and/or flicks their wrist, for example, with user intent to view the screen of the electronic device 102. On the other hand, the wrist-down gesture may be determined when device motion suggests that the user lowers and/or rotates their wrist, for example, indicating user intent not to view the screen of the electronic device 102.

As noted above, some systems may not provide for continuous display of a clock face and/or watch complications. In such systems, the display of the electronic device 102 may be disabled when a wrist-down gesture is detected, and enabled when a wrist-raise gesture is detected. However, in a case where continuous (e.g., or prolonged) display of a clock face and/or watch complications is desired, the electronic device 102 may be configured to activate and/or cancel different power states, for example, based on detected wrist-raise and/or wrist-down gestures, while displaying static image data inbetween.

In one or more implementations, the kernel wake state 424 may be activated upon detection of a wrist-raise gesture, or another gesture (e.g., a touch gesture where the user touches the screen). For example, the wrist raise gesture and/or touch gesture may indicate that the user intends to view and/or otherwise interact with the electronic device 102. In response, the electronic device 102 may be configured to activate the user space, thereby negating the power savings achieved by the display wake state 422. In one or more implementations, the activating of the user space may provide for additional interface elements and/or watch complications that are not provided by the data structure 302 (e.g., movement of a seconds hand and/or data that updates at a high frequency, such as stock prices).

In one or more implementations, the electronic device 102 may be configured to update the data structure 302 with new image frames and new display times, upon activation of the user space (e.g., since the user space is used to generate the data structure 302). Moreover, the data structure 302 may be configured to store a predefined amount of image frames and display times (e.g., 30 frames for display over a 6 minute time period). The electronic device 102 may be configured to update the data structure 302 as the number of image frames and display times decreases to reach a predefined number (e.g., 0, 5 or another preset value). As noted above, this update may be performed during the dark wake state 426 (e.g., in which the user space is active and the display is not being updated). Alternatively or in addition, the update may be performed on a wrist-raise gesture as noted above, on a wrist-down gesture and/or any time updates are needed based on an existing amount of image frames available in the data structure 302 falling below the predefined number (e.g., 0, 5).

In one or more implementations, one or more of components of the display 216, the display driver, the data structure 302, the clock application 408, the time module 410, the time daemons 414-416, the preferences module 412 and/or the preference daemons 418-420 are implemented as software instructions, stored in the memory 208, which when executed by the processor 204, cause the processor 204 to perform particular function(s).

In one or more implementations, one or more of components of the display 216, the display driver, the data structure 302, the clock application 408, the time module 410, the time daemons 414-416, the preferences module 412 and/or the preference daemons 418-420 may be implemented in software (e.g., subroutines and code), hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices), and/or a combination of both. In one or more implementations, some or all of the depicted components may share hardware and/or circuitry, and/or one or more of the depicted components may utilize dedicated hardware and/or circuitry. Additional features and functions of these modules according to various aspects of the subject technology are further described in the present disclosure.

Figure 5:
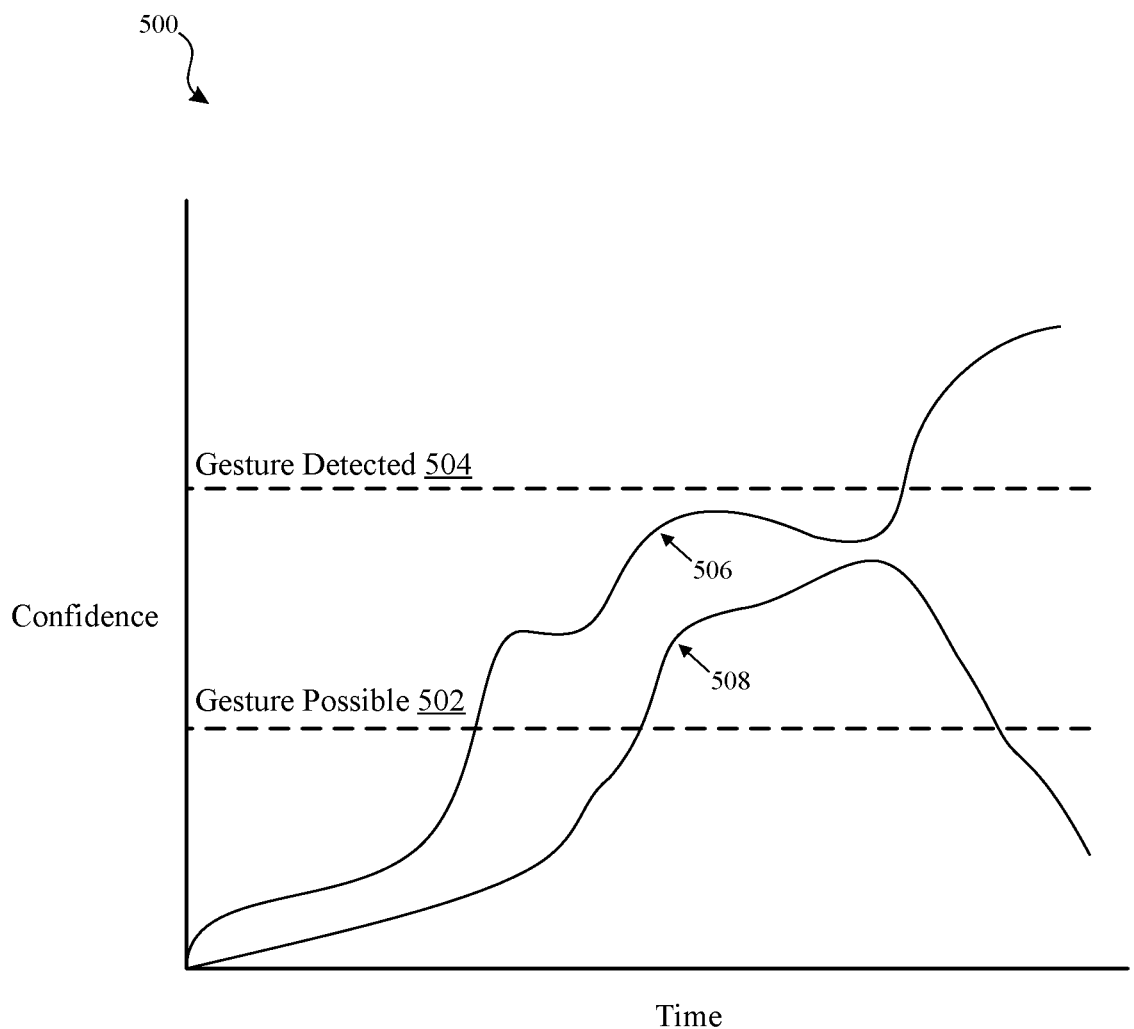
FIG. 5 illustrates an example graph showing different gesture states associated a motion-based gesture in accordance with one or more implementations.

FIG. 5 illustrates an example graph showing different gesture states associated a motion-based gesture in accordance with one or more implementations. For explanatory purposes, FIG. 5 is primarily described herein with reference to the electronic device 102 of FIG. 1. However, FIG. 5 is not limited to the electronic device 102 of FIG. 1, and one or more other components and/or other suitable devices (e.g., any of the electronic device 102-104) may be used instead.

In one or more implementations, the timeline 500 illustrates two gesture states, namely a gesture possible state 502 and a gesture detected state 504, associated with a motion-based gesture. As described herein, the motion-based gesture may correspond to a wrist-raise gesture. As noted above, the wrist-raise gesture may occur when the user (e.g., who is wearing the electronic device 102 on their wrist), raises, rotates and/or flicks their wrist, for example, with user intent to view the screen of the electronic device 102. Based on output received from the sensor(s) 214 (e.g., motion sensors), the processor 204 may generate a confidence score to detect when each of the gesture possible state 502 and the gesture detected state 504 occurs.

The timeline 500 illustrates that each of the gesture possible state 502 and the gesture detected state 504 may be function of confidence (e.g., in device motion as detected by the sensor(s) 214) over time. In one or more implementations, the confidence score may be generated by a machine learning model that takes, e.g., the sensor data as inputs and outputs a confidence score with respect to whether a gesture was detected. The gesture possible state 502 may correspond to meeting a first threshold of confidence that device motion over time indicates a possible wrist-raise gesture. For example, the gesture possible state 502 may correspond with an initial amount of motion (e.g., raising, rotating and/or flicking) within a timeframe, where the initial amount of motion suggests that a wrist-raise gesture may occur. In the example of FIG. 5, both of curves 506 and 508 initially meet the first threshold corresponding to the gesture possible state 502 (e.g., by crossing the gesture possible state 502).

On the other hand, the gesture detected state 504 may correspond to meeting a second threshold of continued device motion (e.g., subsequent/additional device motion beyond meeting the first threshold). For example, the gesture possible state 502 may correspond with a continued amount of motion (e.g., raising, rotating and/or flicking) within a subsequent timeframe, where the continued amount of motion suggests completion of the wrist-raise gesture. In the example of FIG. 5, the curve 506 meets the second threshold corresponding to the gesture detected state 504 (e.g., by crossing the gesture detected state 504). In contrast, the curve 508 does not meet the second threshold corresponding to the gesture detected state 504 (e.g., by not crossing the gesture detected state 504). In one or more implementations, the curve 508 may correspond to a cancel operation. As shown in the example of FIG. 5, the curve 508 also falls below the first threshold for the gesture possible state 502 over time (e.g., by returning below the gesture possible state 502).

The electronic device 102 may be configured to coordinate the activation of different power states for the electronic device 102, for example, based on whether the first threshold (e.g., corresponding with the gesture possible state 502) and/or the second threshold (e.g., corresponding with the gesture detected state 504) are met.

Figure 6A:
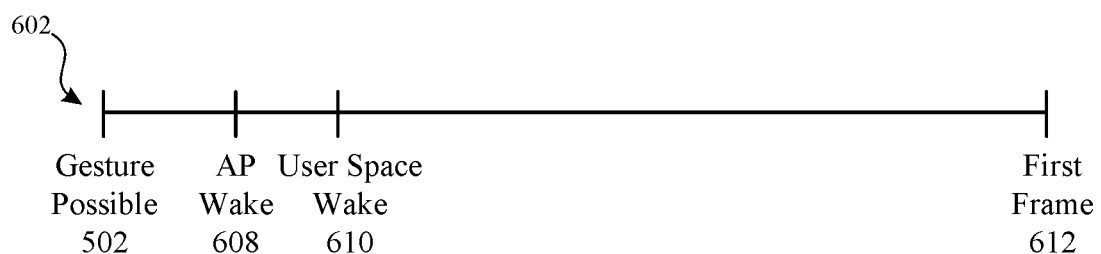
FIGS. 6A-6B illustrate example timelines associated with activating power states based on gesture states in accordance with one or more implementations.
Figure 6B:
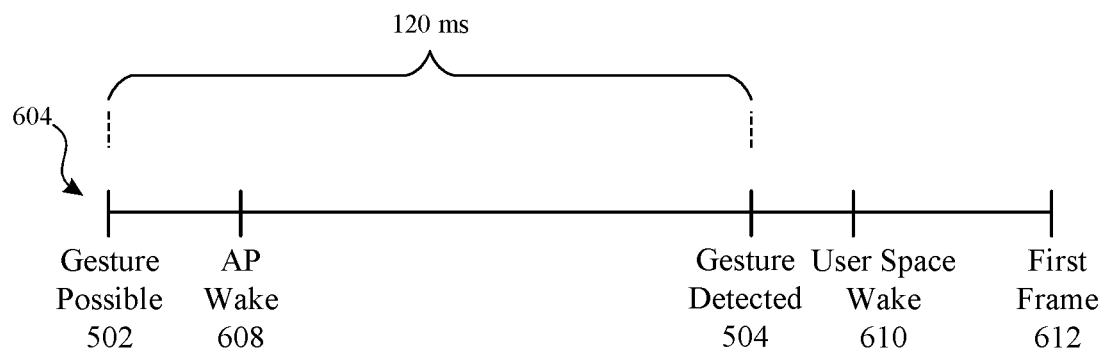

FIGS. 6A-6B illustrate example timelines 602-604 associated with activating power states based on gesture states in accordance with one or more implementations. For explanatory purposes, FIGS. 6A-6B are primarily described herein with reference to the electronic device 102 of FIG. 1. However, FIGS. 6A-6B are not limited to the electronic device 102 of FIG. 1, and one or more other components and/or other suitable devices (e.g., any of the electronic device 102-104) may be used instead.

As shown in FIGS. 6A-6B, the timelines 602-604 include an application processor ("AP") wake state 608 and a user space wake state 610. The AP wake state 608 may correspond to activating an application processor (e.g., the processor 204) without activating the user space (e.g., system memory allocated to running applications). For example, during the AP wake state 608, the kernel of the operating system may be active, while the user space is not active. The user space wake state 610 may correspond with activating the user space, such that applications, such as the clock application, may run.

FIGS. 6A-6B show differences in activating power states (e.g., with respect to a cancel operation). For example, FIG. 6A illustrates a timeline 602 for activating both the AP wake state 608 and the user space wake state 610 based on a single gesture state (e.g., the gesture possible state 502). In the timeline 602, the electronic device 102 detects the gesture possible state 502 (e.g., suggesting that a wrist-raise gesture may occur), and proceeds with activating both the AP wake state 608 and the user space wake state 610 (e.g., without basing activation on the gesture detected state 504). The time between the AP wake state 608 and the user space wake state 610 may be relatively small (e.g., based on the amount of time the AP wake state 608 requires to complete). FIG. 6A further illustrates the display of image data at a first frame state 612.

Moreover, if a cancel operation occurs instead of a gesture detected state 504 (e.g., corresponding to the curve 508), the user space is still activated. As noted, the user space wake state 610 is based on the gesture possible state 502 (e.g., and not the gesture detected state 504).

On the other hand, FIG. 6B illustrates an example timeline 604 for activating the AP wake state 608 and the user space wake state 610 based on different gesture states (e.g., the gesture possible state 502 and the gesture detected state 504). In the timeline 604, the electronic device 102 detects the gesture possible state 502 (e.g., suggesting that a wrist-raise gesture may occur), and proceeds with activating the AP wake state 608. Then, the electronic device 103 is configured to wait for the gesture detected state 504, and proceeds with activating the user space wake state 610 based on the gesture detected state 504. FIG. 6B further illustrates the display of image data at the first frame state 612.

Moreover, if a cancel operation occurs instead of a gesture detected state 504 (e.g., corresponding to the curve 508), the user space is not activated, since user space wake state 610 is based on the gesture detected state 504 (e.g., which would not occur for a cancel operation). As noted above, the user space wake state 610 consumes more power than the AP wake state 608 (e.g., since the processor 204 is running application(s) in addition to the kernel processes in the user space). In the example of FIG. 6B, there may be a time gap (e.g., 120 ms) between the gesture possible state 502 and the gesture detected state 504. In the case of a cancel operation (e.g., where device motion initially suggests that a wrist-raise gesture is possible, but subsequent motion indicates that the wrist-raise gesture did not complete), the user space is not activated during this time gap and power consumption may be reduced (e.g., relative to the power consumption associated with FIG. 6A). For example, the cancel operation may occur a certain percentage (e.g., 10%, 20%, 30%, or any percent) of the time the gesture possible state 502 is detected, which may save minutes and/or hours of device usage time over the course of a day.

In one or more implementations, the kernel of the operating system for the electronic device 102 may be configured to brighten the display upon activation of the AP wake state 608, but before activating the user space (e.g., prior to the user space wake state 610). With respect to FIGS. 6A-6B, there may be a time gap (e.g., 112 ms, not shown) between the user space wake state 610 and the first frame state 612. For example, this time gap may be attributable to the amount of time required to power the display of the electronic device 102. The time gap may be perceived by the user as a delay in wake time for the electronic device 102. Thus, in one or more implementations, the kernel may be configured to brighten the display after the AP wake state 608 and before the user space wake state 610, to increase the perceived wake time of the electronic device 102 (e.g., to provide the perception that the brightening of the display corresponds to the device activating).

Figure 7:
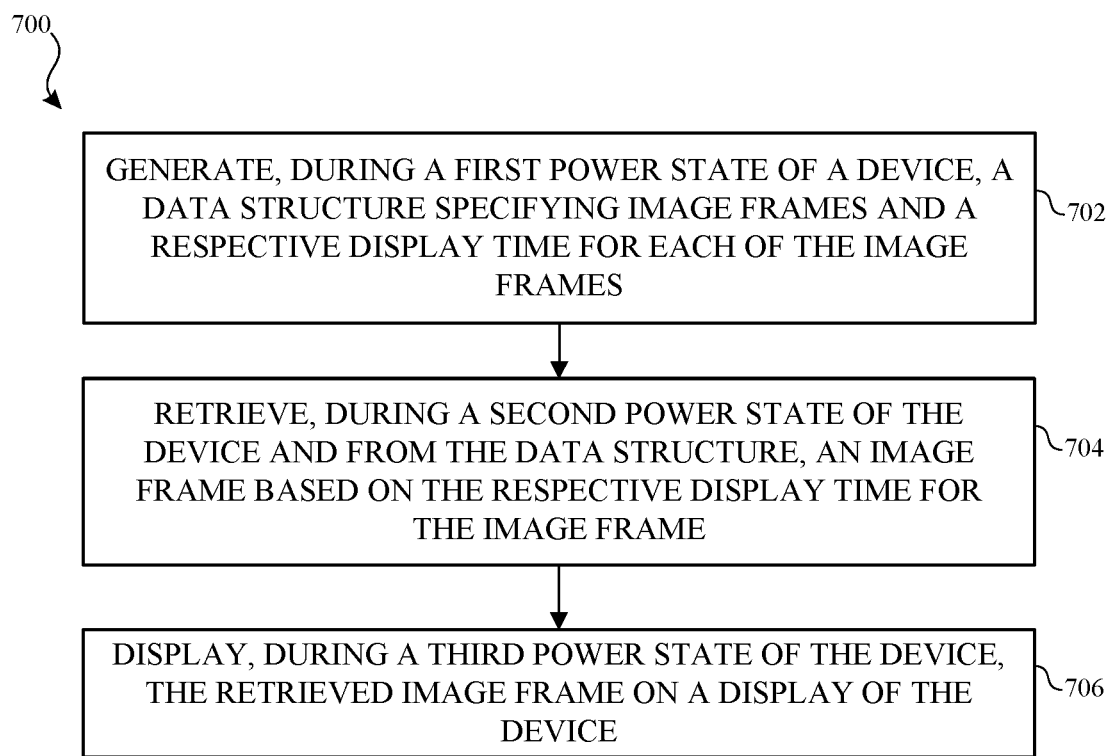
FIG. 7 illustrates a flow diagram of an example process for managing power consumption while displaying images in accordance with one or more implementations.

FIG. 7 illustrates a flow diagram of an example process for managing power consumption while displaying images in accordance with one or more implementations. For explanatory purposes, the process 700 is primarily described herein with reference to the electronic device 102 of FIG. 1. However, the process 700 is not limited to the electronic device 102 of FIG. 1, and one or more blocks (or operations) of the process 700 may be performed by one or more other components and other suitable devices (e.g., any of the electronic devices 102-104). Further for explanatory purposes, the blocks of the process 700 are described herein as occurring in serial, or linearly. However, multiple blocks of the process 700 may occur in parallel. In addition, the blocks of the process 700 need not be performed in the order shown and/or one or more blocks of the process 700 need not be performed and/or can be replaced by other operations.

The electronic device 102 generates, during a first power state of the electronic device 102, a data structure specifying image frames and a respective display time for each of the image frames (702). The first power state may correspond to activating a user space of the electronic device 102, the user space corresponding to system memory allocated to running an application on the electronic device 102. The first power state may correspond to activating a clock application on the electronic device 102. The image frames may correspond to at least one of clock hands or watch complications.

During the generating, the display may continuously display a static image frame. In one or more implementations, the data structure may include two queues of image frames with respective display times, each of the two queues corresponding to a respective display layer.

The electronic device 102 may implement a virtual memory configured to re-map to a portion of physical memory corresponding to part of an image frame that does not change between display times. In one or more implementations, the image frames may be specified by the data structure based on at least one of glyphs or animation descriptors for compositing images.

The electronic device 102 retrieves, during a second power state of the electronic device 102 and from the data structure, an image frame based on the respective display time for the image frame (704). The second power state may correspond to activating a display driver of the electronic device 102. The retrieving may be performed by the display driver, and the display driver may be configured to provide the retrieved image frame to the display of the electronic device 102 for display.

The electronic device 102 displays, during a third power state of the electronic device 102, the retrieved image frame on a display of the electronic device 102 (706). The third power state may correspond to the display displaying the most recent image frame (e.g., as provided by the display buffer). For example, the display may retrieve the image from a framebuffer. The continuous display of a static image frame on the display may use less power than refreshing/changing the displayed image.

Figure 8:
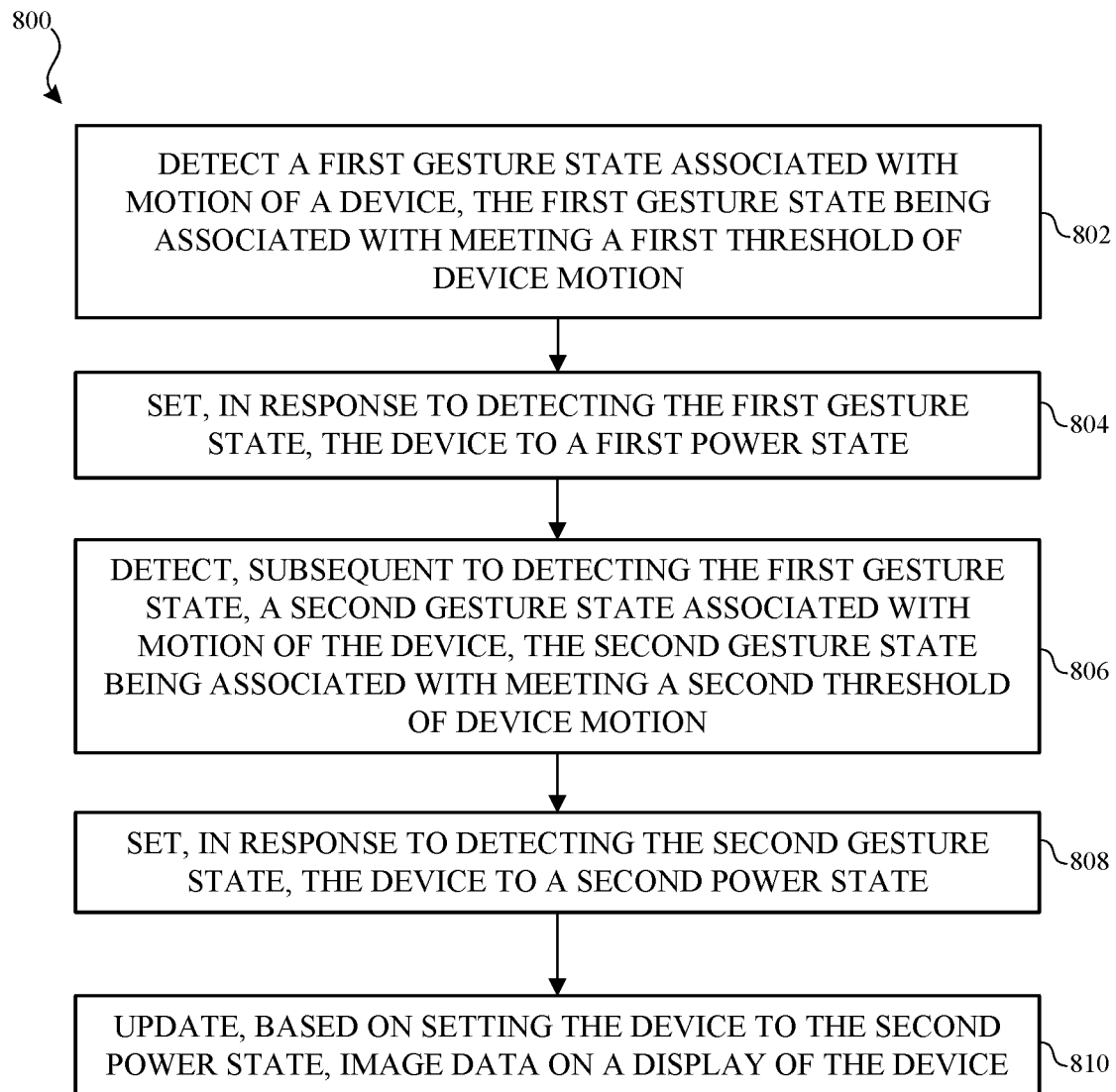
FIG. 8 illustrates a flow diagram of an example process for changing power states based on gesture states in accordance with one or more implementations.

FIG. 8 illustrates a flow diagram of an example process for changing power states based on gesture states in accordance with one or more implementations. For explanatory purposes, the process 800 is primarily described herein with reference to the electronic device 102 of FIG. 1. However, the process 800 is not limited to the electronic device 102 of FIG. 1, and one or more blocks (or operations) of the process 800 may be performed by one or more other components and other suitable devices (e.g., any of the electronic devices 102-104). Further for explanatory purposes, the blocks of the process 800 are described herein as occurring in serial, or linearly. However, multiple blocks of the process 800 may occur in parallel. In addition, the blocks of the process 800 need not be performed in the order shown and/or one or more blocks of the process 800 need not be performed and/or can be replaced by other operations.

The electronic device 102 detects a first gesture state associated with motion of the electronic device 102, the first gesture state being associated with meeting a first threshold of device motion (802). The electronic device 102 sets, in response to detecting the first gesture state, the electronic device 102 to a first power state (804).

The electronic device 102 detects, subsequent to detecting the first gesture state, a second gesture state associated with motion of the electronic device 102, the second gesture state being associated with meeting a second threshold of device motion (806). The first threshold may correspond to a first confidence score of user intent to view the display based on motion of the electronic device 102, and the second threshold may correspond to a second confidence score of user intent to view the display based on motion of the electronic device 102, the second confidence score exceeding the first confidence score. The electronic device 102 may increase a brightness of the display in response to detecting the first gesture state and prior to detecting the second gesture state.

The electronic device 102 sets, in response to detecting the second gesture state, the electronic device 102 to a second power state (808). The first power state may correspond to activating an application processor of the electronic device 102. The second power state may correspond to activating a user space of the electronic device 102, the user space corresponding to user applications (e.g., non-kernel processes) running on the electronic device 102.

The electronic device 102 updates, based on setting the electronic device 102 to the second power state, image data on a display of the electronic device 102 (810). The first gesture state and the second gesture state may relate to a wrist-raise gesture of the electronic device 102. The electronic device 102 may be a smartwatch, and updating the image data may be for displaying a first frame upon completion of the wrist-raise gesture.

The first and second thresholds of device motion may be subject to respective time restrictions. The electronic device 102 may associate the first gesture state with a cancel operation in a case where the second gesture does not meet its respective time restriction. The cancel operation may correspond to refraining from setting the electronic device 102 to the second power state and refraining from updating the image data.

As described above, one aspect of the present technology is the gathering and use of data available from specific and legitimate sources for displaying image data. The present disclosure contemplates that in some instances, this gathered data may include personal information data that uniquely identifies or can be used to identify a specific person. Such personal information data can include demographic data, location-based data, online identifiers, telephone numbers, email addresses, home addresses, data or records relating to a user's health or level of fitness (e.g., vital signs measurements, medication information, exercise information), date of birth, or any other personal information.

The present disclosure recognizes that the use of such personal information data, in the present technology, can be used to the benefit of users. For example, the personal information data can be used for displaying image data. Accordingly, use of such personal information data may facilitate transactions (e.g., on-line transactions). Further, other uses for personal information data that benefit the user are also contemplated by the present disclosure. For instance, health and fitness data may be used, in accordance with the user's preferences to provide insights into their general wellness, or may be used as positive feedback to individuals using technology to pursue wellness goals.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominently and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations which may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of displaying image data, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

Figure 9:
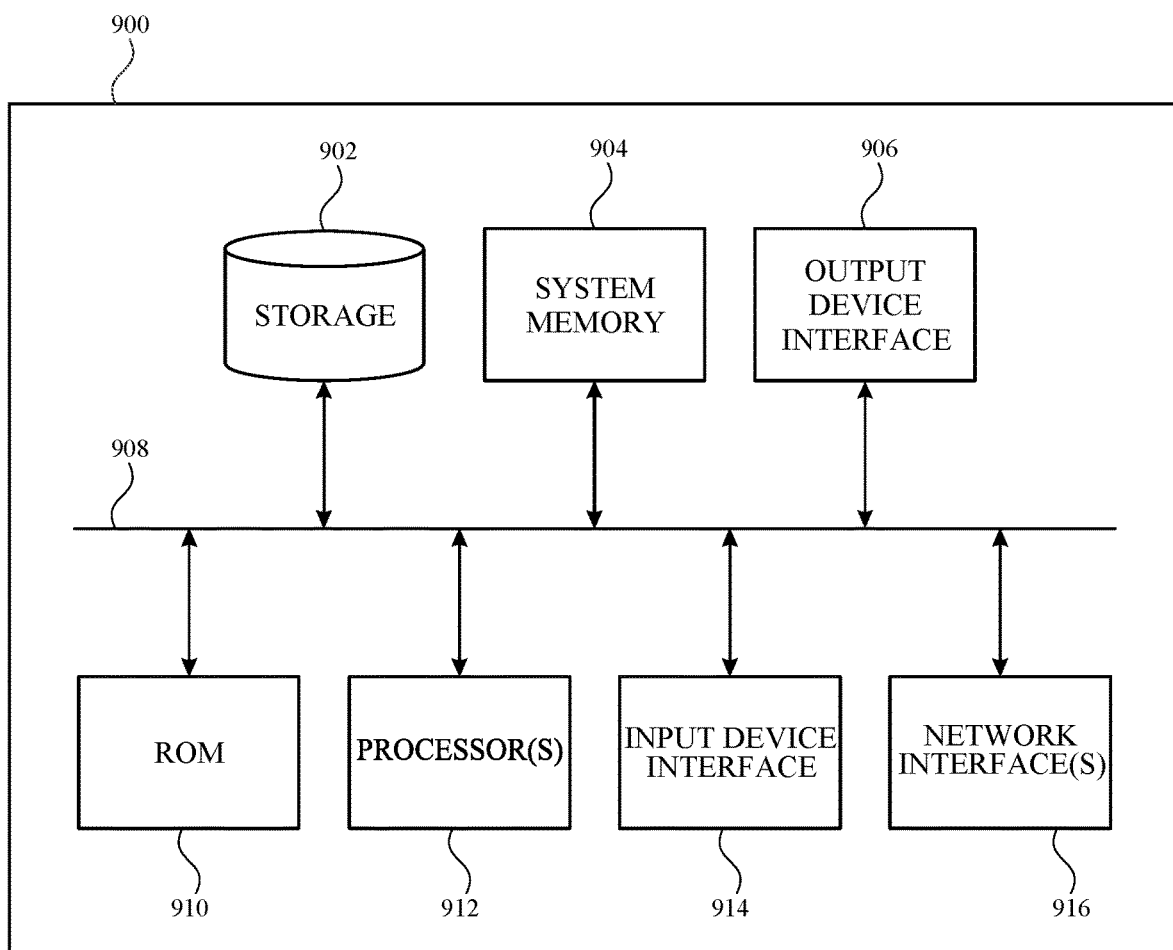
FIG. 9 illustrates an example electronic system with which aspects of the subject technology may be implemented in accordance with one or more implementations.

FIG. 9 illustrates an electronic system 900 with which one or more implementations of the subject technology may be implemented. The electronic system 900 can be, and/or can be a part of, one or more of the electronic devices 102-104, and/or one or the server 108 shown in FIG. 1. The electronic system 900 may include various types of computer readable media and interfaces for various other types of computer readable media. The electronic system 900 includes a bus 908, one or more processing unit(s) 912, a system memory 904 (and/or buffer), a ROM 910, a permanent storage device 902, an input device interface 914, an output device interface 906, and one or more network interfaces 916, or subsets and variations thereof.

The bus 908 collectively represents all system, peripheral, and chipset buses that communicatively connect the numerous internal devices of the electronic system 900. In one or more implementations, the bus 908 communicatively connects the one or more processing unit(s) 912 with the ROM 910, the system memory 904, and the permanent storage device 902. From these various memory units, the one or more processing unit(s) 912 retrieves instructions to execute and data to process in order to execute the processes of the subject disclosure. The one or more processing unit(s) 912 can be a single processor or a multi-core processor in different implementations.

The ROM 910 stores static data and instructions that are needed by the one or more processing unit(s) 912 and other modules of the electronic system 900. The permanent storage device 902, on the other hand, may be a read-and-write memory device. The permanent storage device 902 may be a non-volatile memory unit that stores instructions and data even when the electronic system 900 is off. In one or more implementations, a mass-storage device (such as a magnetic or optical disk and its corresponding disk drive) may be used as the permanent storage device 902.

In one or more implementations, a removable storage device (such as a floppy disk, flash drive, and its corresponding disk drive) may be used as the permanent storage device 902. Like the permanent storage device 902, the system memory 904 may be a read-and-write memory device. However, unlike the permanent storage device 902, the system memory 904 may be a volatile read-and-write memory, such as random access memory. The system memory 904 may store any of the instructions and data that one or more processing unit(s) 912 may need at runtime. In one or more implementations, the processes of the subject disclosure are stored in the system memory 904, the permanent storage device 902, and/or the ROM 910. From these various memory units, the one or more processing unit(s) 912 retrieves instructions to execute and data to process in order to execute the processes of one or more implementations.

The bus 908 also connects to the input and output device interfaces 914 and 906. The input device interface 914 enables a user to communicate information and select commands to the electronic system 900. Input devices that may be used with the input device interface 914 may include, for example, alphanumeric keyboards and pointing devices (also called "cursor control devices"). The output device interface 906 may enable, for example, the display of images generated by electronic system 900. Output devices that may be used with the output device interface 906 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 9, the bus 908 also couples the electronic system 900 to one or more networks and/or to one or more network nodes, such as the server 108 shown in FIG. 1, through the one or more network interface(s) 916. In this manner, the electronic system 900 can be a part of a network of computers (such as a LAN, a wide area network ("WAN"), or an Intranet, or a network of networks, such as the Internet. Any or all components of the electronic system 900 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some implementations, one or more implementations, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other implementations. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f), unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method, comprising:
generating, during a first power state of a device, a data structure specifying image frames and a respective scheduled display time of day for each of the image frames;
retrieving, during a second power state of the device and from the data structure, an image frame based on the respective scheduled display time of day for the image frame, wherein the second power state is different than the first power state; and
displaying, during a third power state of the device, the retrieved image frame on a display of the device at the respective scheduled display time of day, wherein the third power state is different than the first and second power states and an entirety of the retrieved image frame having been generated during the first power state.

2. The method of claim 1, wherein the first power state corresponds to activating a user space of the device, the user space corresponding to system memory allocated to running an application on the device.

3. The method of claim 2, wherein the first power state further corresponds to activating a clock application on the device.

4. The method of claim 2, wherein during the generating, the display displays a static image frame.

5. The method of claim 1, wherein the second power state corresponds to activating a display driver of the device, the display driver being separate from the display.

6. The method of claim 5, wherein the retrieving is performed by the display driver, and
wherein the display driver is configured to provide the retrieved image frame to the display of the device for display.

7. The method of claim 1, wherein the third power state corresponds to displaying most recent image data, the most recent image data corresponding to the retrieved image frame.

8. The method of claim 7, wherein the display is configured to obtain the retrieved image frame from a framebuffer.

9. The method of claim 1, wherein the device implements a virtual memory configured to re-map to a portion of physical memory corresponding to part of an image frame that does not change between display times.

10. The method of claim 1, wherein the image frames are specified by the data structure based on at least one of glyphs or animation descriptors for compositing images.

11. The method of claim 1, wherein the image frames correspond to at least one of clock hands or watch complications.

12. The method of claim 1, wherein the data structure comprises two queues of image frames with respective display times, each of the two queues corresponding to a respective display layer.

13. The method of claim 1, wherein the respective scheduled display time of day for each respective image frame corresponds to a respective time of day that is displayed by each respective image frame.

14. A device, comprising:
- at least one processor; and
- a memory including instructions that, when executed by the at least one processor, cause the at least one processor to:
  - generate, during a first power state of the device, a data structure comprising image frames and a respective pre-selected display time of day for each of the image frames;
  - retrieve, during a second power state of the device and from the data structure, an image frame based on the respective pre-selected display time of day for the image frame and a current time, the second power state being different than the first power state; and
  - display, during a third power state of the device, the retrieved image frame on a display of the device at the pre-selected display time of day, the third power state being different than the first and second power states and the retrieved image frame having been generated during the first power state.

15. The device of claim 14, wherein the first power state corresponds to activating a user space of the device, the user space corresponding to system memory allocated to running an application on the device.

16. The device of claim 15, wherein the first power state further corresponds to activating a clock application on the device.

17. The device of claim 15, wherein during the generating, the display displays a static image frame.

18. The device of claim 15, wherein the second power state corresponds to activating a display driver of the device, the display driver providing an interface between the processor and the display and the display driver being separate from the display.

19. The device of claim 18, wherein the retrieving is performed by the display driver, and
wherein the display driver is configured to provide, via a framebuffer, the retrieved image frame to the display of the device for display.

20. The device of claim 19, wherein the third power state corresponds to displaying most recent image data, the most recent image data corresponding to the retrieved image frame.

21. A computer program product comprising code, stored in a non-transitory computer-readable storage medium, the code comprising:
- code to generate, by a processor and during a first power state of a device, a data structure comprising image frames and a respective scheduled display time of day for each of the image frames;
- code to retrieve, by the processor and during a second power state of the device and from the data structure, one of the image frames generated in the first power state based on the respective scheduled display time of day for the image frame and a current time, the second power state being different than the first power state; and
- code to provide, by the processor and during a third power state of the device, the retrieved one of the image frames generated in the first power state for display on a display of the device at the respective scheduled display time of day, the third power state being different than the first and second power states,
wherein the first power state corresponds to activating a user space of the device, the second power state corresponds to activating a display driver of the device and powering down the user space, and the third power state corresponds to activating the display of the device, wherein the display driver is separate from the display and provides an interface between the processor and the display.

22. The computer program product of claim 21, wherein an entirety of the retrieved one of the image frames is generated in the first power state.

* * * * *